United States Patent
Takada

(10) Patent No.: US 9,169,984 B2
(45) Date of Patent: Oct. 27, 2015

(54) VEHICULAR LAMP WITH PILLAR SHAPED LIGHT GUIDE AND LENS WITH THICK WALLED PROJECTING PORTION

(71) Applicant: KOITO MANUFACTURING CO., LTD., Tokyo (JP)

(72) Inventor: Ryo Takada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 100 days.

(21) Appl. No.: 14/173,001

(22) Filed: Feb. 5, 2014

(65) Prior Publication Data

US 2014/0218951 A1 Aug. 7, 2014

(30) Foreign Application Priority Data

Feb. 7, 2013 (JP) ................................ 2013-021859

(51) Int. Cl.
*F21S 8/10* (2006.01)
*B62J 6/02* (2006.01)

(52) U.S. Cl.
CPC ............... *F21S 48/1291* (2013.01); *B62J 6/02* (2013.01); *F21S 48/1159* (2013.01); *F21S 48/1241* (2013.01); *F21S 48/1266* (2013.01); *F21S 48/2212* (2013.01); *F21S 48/2237* (2013.01); *F21S 48/2268* (2013.01); *F21S 48/2287* (2013.01); *F21S 48/236* (2013.01); *F21S 48/24* (2013.01)

(58) Field of Classification Search
CPC .............. F21S 48/2225; F21S 48/2237; F21S 48/2287; F21S 48/2268; F21S 48/129; F21S 48/124; F21S 48/125; F21S 48/1266; B60Q 1/0011
See application file for complete search history.

(56) References Cited

U.S. PATENT DOCUMENTS

| | | | |
|---|---|---|---|
| 8,585,270 B2 * | 11/2013 | Nakada | 362/602 |
| 2012/0218775 A1 | 8/2012 | Nakada | |
| 2013/0201709 A1 * | 8/2013 | Natsume | 362/511 |

FOREIGN PATENT DOCUMENTS

JP 2012-174641 A 9/2012

* cited by examiner

*Primary Examiner* — Robert May
(74) *Attorney, Agent, or Firm* — Osha Liang LLP

(57) ABSTRACT

A vehicular lamp has a light source, a pillar-shaped light guide having a plurality of light controlling portions formed on a side surface thereof, and a lens disposed in front of the light guide. Light emitted from the light source enters the light guide from one end surface of the light guide. The light guide guides the light inside the light guide. The light guide emits the guided light forward of the vehicular lamp via the plurality of light controlling portions. The lens has a thick-walled projecting portion. The projecting portion is formed to have a rectangular vertical cross-section. The projecting portion guides the light emitted from the light guide and emits the light forward of the vehicular lamp.

5 Claims, 3 Drawing Sheets

VEHICULAR LAMP WITH PILLAR SHAPED LIGHT GUIDE AND LENS WITH THICK WALLED PROJECTING PORTION

BACKGROUND

1. Technical Field

The present invention relates to a vehicular lamp that has a light guide and emits light by guiding the light.

2. Related Art

A conventionally known vehicular lamp is configured such that light emitted from a light source, such as a light emitting diode, is allowed to enter a light guide from one end surface thereof, the guided light is internally reflected by a plurality of internal reflection steps (light controlling portion) formed on a side surface of the light guide so as to be diffused, and the diffused light is emitted forward of the lamp. For example, Patent Document 1 describes a vehicular lamp that has a pillar-shaped light guide disposed in a lamp chamber that is defined by an outer lens and a lamp body. The vehicular lamp emits light through the translucent plate-like outer lens that extends in front of the light guide.

Japanese Patent Application Laid-Open (Kokai) No. 2012-174641 (see FIG. 1)

SUMMARY

A conventional vehicular lamp, however, may have luminescent unevenness that is caused by the internal reflection steps in the light guide directly appears in light emission of the lamp.

A vehicular lamp according to one or more embodiments of the present invention has improved appearance when the lamp is lit.

According to one or more embodiments of the present invention, a vehicular lamp includes: a light source; a pillar-shaped light guide that allows light emitted from the light source to enter the light guide from one end surface thereof, guides light inside the light guide, and emits the guided light forward of the lamp by using a plurality of light controlling portions formed on a side surface of the light guide; and a lens that is placed in front of the light guide. The vehicular lamp is characterized in that the lens has a thick-walled projecting portion, the projecting portion is formed to have a rectangular vertical cross-section, and the projecting portion guides the light emitted from the light guide and emits the light forward of the lamp.

According to one or more embodiments of the present invention, a front member is provided in front of the lens so as to conceal a connecting portion between the lens and a lamp body, and the projecting portion is exposed from the front member.

According to one or more embodiments of the present invention, the projecting portion is formed to extend along a front surface shape of the front member.

According to one or more embodiments of the present invention, the light source and the light guide are provided in a lamp chamber that is defined by the lens and the lamp body, and the width of the connecting portion between the lens and the lamp body is made wider than the width of the projecting portion.

According to one or more embodiments of the present invention, the lens has the thick-walled projecting portion, and the projecting portion is formed to have a rectangular vertical cross-section. Accordingly, the projecting portion has two side surfaces that extend to the front of the lamp and face each other. Internal reflection occurs on the side surfaces of the projecting portions, which allows the projecting portion of the lens to uniformly emit light in a band-like manner. Therefore, unevenness of the light emitted from the light guide is corrected.

According to one or more embodiments of the present invention, because the projecting portion is formed to have a rectangular vertical cross-section, corner portions are formed on the front side of the lens, and the guided light condenses at the corner portions. This highlights lines formed of the corner portions as viewed from the front of the lamp. This provides a novel lit appearance in which the corner portions are illuminated linearly with a distinct definition.

Refraction of light in the projecting portion makes it difficult to visually recognize the inside of the lens as viewed from the front of the lamp both when the lamp is lit and when not lit. In this respect, according to one or more embodiments of the present invention, a good appearance is provided to the lamp.

According to one or more embodiments of the present invention, the front member such as a cowl or a cover is provided to conceal the connecting portion between the lens and lamp body, which is provided in the periphery of the lamp, and the projecting portion of the lens is exposed from the front surface of the front member. This configuration allows the light to be emitted from the projecting portion without being blocked by the front member and to be easily diffused from the projecting portion. Moreover, the projecting portion that is exposed from the front member forms a novel lamp design.

According to one or more embodiments of the present invention, the projecting portion that is exposed from the front member is formed to extend along a front surface shape of the front member which is formed in a three dimensional curved shape along the vehicle design. Therefore, the lens (the projecting portion) does not project from the vehicle, which ensures the safety of the lamp and also provides a good appearance to the lamp.

According to one or more embodiments of the present invention, because the lens and the lamp body are welded together at the connecting portion by resin welding, burrs are inevitably produced, and thus the connecting portion is likely to have a poor appearance. However, in the lamp vertical cross-section, the width of the connecting portion between the lens and the lamp body is made wider than the width of the projecting portion such that the inside of the lens (particularly, the connecting portion) is not visually recognized from the gap between the projecting portion of the lens and the front member as viewed from the front of the lamp. In this respect as well, a further excellent appearance is provided to the lamp.

DETAILED DESCRIPTION

Figure 1:
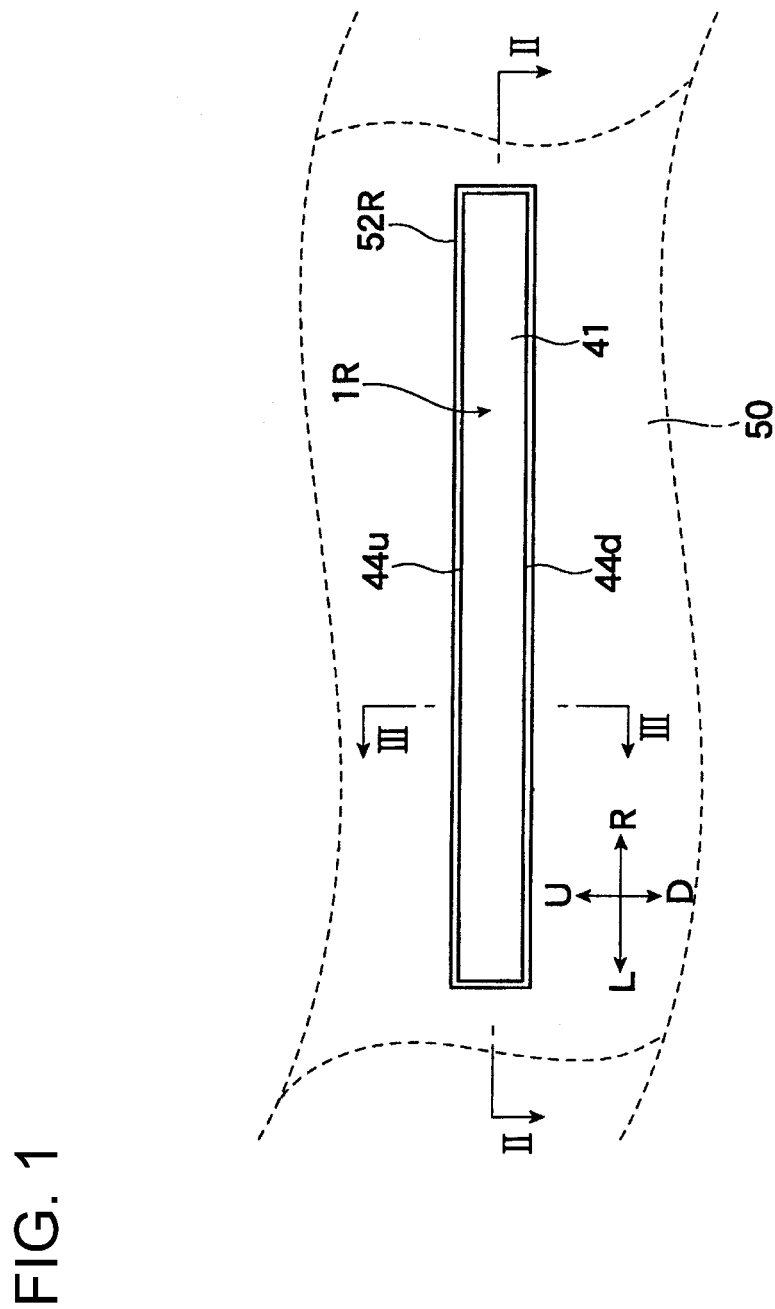
FIG. 1 is a front view of a vehicular lamp according to one or more embodiments of the present invention.
Figure 2:
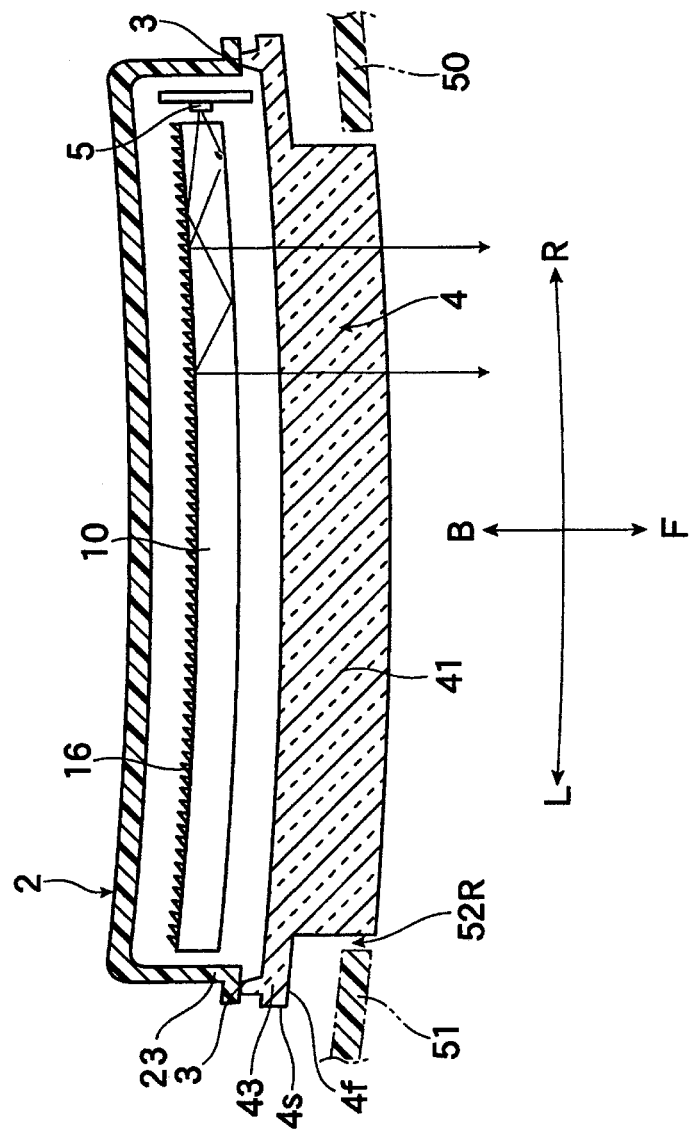
FIG. 2 is a horizontal cross-sectional view of the lamp that is taken along the line II-II in FIG. 1.
Figure 3:
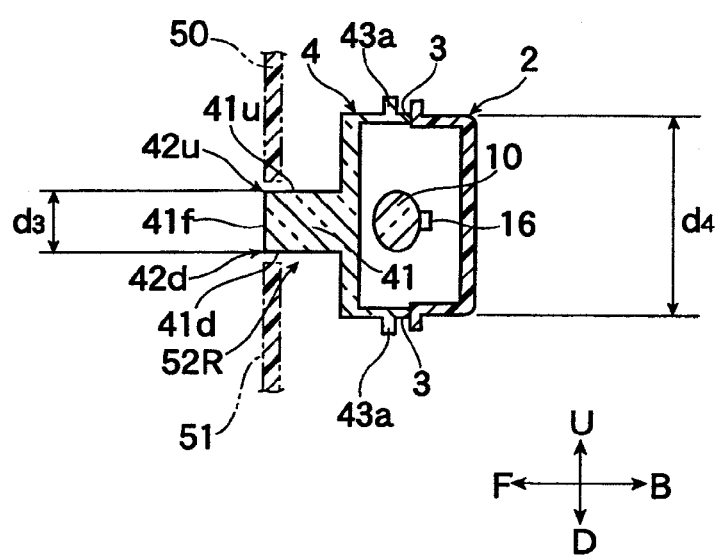
FIG. 3 is a vertical cross-sectional view of the lamp that is taken along the line III-III in FIG. 1.

Embodiment of the present invention will be described with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a front view of a vehicular lamp according to one or more embodiments of the present invention. FIG. 2 is a horizontal cross-sectional view of the lamp that is taken along the line II-II in FIG. 1. FIG. 3 is a vertical cross-sectional view of the lamp that is taken along the line III-III in FIG. 1. In one or more embodiments of the present invention, a vehicular lamp is applied to a headlight of a motorcycle, for example. Arrows in FIG. 2 show part of light rays in the lamp.

Reference characters 1R and 1L refer to lamp units that radiate light in a travel direction of a motorcycle 1, and the lamp units are provided in the front of the motorcycle 1 (not shown). The lamp 1R is provided on the right of the vehicle as viewed from the front, and the lamp 1L is provided on the left of the vehicle as viewed from the front. In the following detailed description, the lamp 1R will be used. The lamp 1L is structured symmetrically about the center of the vehicle as viewed from the front of the vehicle. Therefore, with the descriptions of the lamp 1R, descriptions of the lamp 1L in the specification and the drawings will be omitted.

The lamp 1R has an LED 5 serving as a light source and a light guide 10, which are accommodated in a lamp chamber that is defined by resin welding of a lens 4 formed of, for example, a translucent acrylic resin and a lamp body 2 formed of an ABS resin or the like. The lens 4 and the lamp body 2 are joined together to be waterproof.

The LED 5 is mounted on an electronic substrate and provided, as a light source unit, on the right side in the lamp chamber. In the drawings, reference characters L and R show the lateral direction in the lamp chamber, reference characters U and D show the vertical direction in the lamp chamber, and the reference characters F and B show the front-rear direction in the lamp chamber.

The light guide 10 is an optical member made of a synthetic resin such as an acrylic resin, and is formed in a pillar shape. The light guide 10 is arranged so as to extend in the lateral direction in the lamp chamber. The LED 5 is provided to face the right end surface of the light guide 10 such that the radiation axis of the LED 5 is orthogonal to the end surface of the light guide. The light from the light source of the LED 5 is incident on the end surface, and guided in the light guide 10 to the other end surface while totally reflected repeatedly by an inner surface of the light guide 10.

Internal reflection steps 16 (light controlling portions) are provided in the rear side surface of the light guide 10 (a position corresponding to the right of the circular section in FIG. 3) to cause light to internally reflect forward of the lamp. The internal reflection steps 16 are formed entirely in the extending direction of the light guide 10 so that the guided light is emitted toward the lens 4.

In this application, a pillar shape is a concept including a prismatic shape in addition to a cylindrical shape shown above.

The lens 4 is formed from a front surface 4$f$ and a side surface 4$s$, and is placed in front of the light guide 10. The front surface 4$f$ has a projecting portion 41 for light guiding, which is formed along the extending direction of the light guide 10. The side surface 4$s$ has a fixing projecting portion 45 (not shown) that is for fixing the lamp 1R. The side surface 4$s$ also has a lens-side connecting portion 43 that is formed by projecting a peripheral portion of the side surface 4$s$ to the rear of the lamp. The lens-side connecting portion 43 is welded to a body-side connecting portion 23 that is a peripheral portion of the lamp body 2 shaped to open to the front.

The projecting portion 41 of the lens 4 is formed as a thick wall and is formed to have a rectangular vertical cross-section (see FIG. 3). Accordingly, the projecting portion 41 naturally has the front surface 41$f$, and an upper surface 41$u$ and a lower surface 41$d$ that extend to the front of the lamp and face each other. Internal reflection occurs on the upper and lower surfaces 41$u$ and 41$d$. Therefore, according to one or more embodiments of the present invention, the thickness of the thick-walled projecting portion 41 has a length that allows internal reflection (total reflection) to occur at least once on the upper and lower surfaces 41$u$ and 41$d$.

Moreover, the projecting portion 41 is placed in such a position that the projecting portion 41 faces the internal reflection steps 16 of the light guide 10 (including a position symmetric about the center of the light guide). The projecting portion 41 guides the light emitted from the light guide 10 and emits the light forward of the lamp.

The lens-side connecting portion 43 has a burr concealing portion 43$a$ that projects in the vertical direction of the lamp.

The motorcycle 1 according to one or more embodiments of the present invention has a cowl 50 attached to a front side of the vehicle body frame. The cowl 50 is a front member that conceals a connecting portion 3 between the lens 4 and the lamp body 2 in each of the lamps 1R and 1L. Note that the front member also has a role to conceal, in addition to the connecting portion 3, the LED 5 as a light source so that the LED 5 cannot be seen as viewed from the front of the vehicle. The cowl 50 is one example of such a member, and any member, such as a cover, may be used as long as the member has the above role.

The cowl 50 is formed in a three dimensional curved shape such that the cowl 50 curves to the left and right of the vehicle from the vehicle center, along the vehicle design. The cowl 50 has opening portions 52R and 52L that expose part of the lamps 1R and 1L, respectively (see FIG. 2). The cowl 50 also has fixing recessed portions 55 (not shown) that fit to the fixing projecting portion 45 of the respective lamps 1R and 1L on the rear surface of the cowl 50 and around the respective opening portions 52R and 52L.

The lamp 1R is fixedly fitted to the cowl 50 such that the front surface 41$f$ of the projecting portion 41 of the lens 4 is exposed from the opening portion 52R of the cowl 50.

The shape of the projecting portion 41 of the lens 4 is, therefore, a three-dimensional curved shape that is generally identical to the shape of a front surface 51 of the cowl 50.

A width d4 of the connecting portion 3 is the resin-welded portion of the lens-side connecting portion 43 and the body-side connecting portion 23. The width d4 is made wider than a width d3 of the projecting portion 41 of the lens 4 in the vertical section of the lamp 1R (see FIG. 3).

According to one or more embodiments of the present invention, in the above configuration, the thick-walled projecting portion 41 is formed in the lens 4 so as to have a rectangular vertical cross-section (rectangle). Accordingly, the upper surface 41$u$ and the lower surface 41$d$ are formed in the projecting portion 41 so as to project to the front of the lamp and face each other. Internal reflection occurs on the upper and lower surfaces 41$u$ and 41$d$ of the projecting portion 41, and the projecting portion 41 of the lens uniformly emits light in a band-like manner. Therefore, unevenness of the light emitted from the light guide 10 is corrected.

In addition, because the projecting portion 41 is formed to have a rectangular vertical cross-section, the front surface 41$f$ of the projecting portion 41 has upper and lower corner portions 42$u$ and 42$d$ as viewed in the vertical cross-section (see FIG. 3). When the LED 5 is lit, the light is guided and internally reflected inside the light guide 10, and the guided light condenses at the corner portions 42u and 42d. This highlights an upper peripheral portion 44u of the projecting portion 41, which is formed of the corner portion 42u, and an lower peripheral portion 44d of the projecting portion 41, which is formed of the lower corner portion 42d, and the portions are illuminated linearly as viewed from the front of the lamp (see FIG. 1). This provides a novel lit appearance in which the outer periphery of the lamp 1R (projecting portion 41) that is exposed from the cowl 50 is illuminated linearly with a distinct definition as viewed from the front of the lamp.

The configuration in which the projecting portion 41 of the lens 4 is exposed from the front surface 51 of the cowl 50 allows the light to be emitted from the front surface 41f of the projecting portion 41 without being blocked by the cowl 50 and to be easily diffused from the projecting portion 41.

The projecting portion 41 that is exposed from the cowl 50 forms a novel lamp design both when the lamp is lit and when not lit.

The projecting portion 41 that is exposed from the cowl 50 extends along the shape of the front surface 51 of the cowl 50 which is formed in a three dimensional curved shape along the vehicle design of the motorcycle 1. Therefore, the projecting portion 41 of the lens dose not project from the vehicle. This ensures the safety of the lamps 1R and 1L and also provides a good appearance to the lamps 1R and 1L.

Refraction of light in the projecting portion 41 makes it difficult to visually recognize the inside of the lens 4 as viewed from the front of the lamp both when the lamp is lit and when not lit. In this respect as well, a good appearance is provided to the lamp.

Because the lens 4 and the lamp body 2 are welded together at the connecting portion 3 by resin welding, burrs are inevitably produced, and thus the connecting portion 3 is likely to have a poor appearance. However, in the lamp vertical cross-section, the width d4 of the connecting portion 3 is formed wider than the width d3 of the projecting portion 41 such that the inside of the lens 4 (particularly, the connecting portion 3) is not visually recognized from the gap between the projecting portion 41 of the lens and the cowl 50 (opening portions 52R and 52L) as viewed from the front of the lamp. In this respect as well, a further excellent appearance is provided to the lamp.

Above, the vehicular lamp is explained with an example in which the light guide 10 and the projecting portion 41 of the lens 4 extend in the lateral direction in the lamp chamber. However, the present invention is not limited to the configuration, and, for example, the configuration in which the light guide 10 and the projecting portion 41 extend in the vertical direction in the lamp chamber may also be employed. This configuration also produces a similar effect to the above.

Above, the vehicular lamp is explained with an example in which the outer lens 4 is exposed from the cowl 50. However, the present invention is not limited to the configuration, and an inner lens may be used.

In the present application, a vertical cross-section of the projecting portion is not limited to the above rectangle but may be a polygonal shape such as a triangle and a pentagon, and a shape that has an arc smoothly connecting between corner portions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

1R Lamp
2 Lamp Body
3 Connecting Portion
4 Lens
5 LED
10 Light Guide
16 Internal Reflection Step (Light Controlling Portions)
41 Projecting Portion of Lens
42u 42d Corner
44u 44d Peripheral Portion
50 Cowl
51 Front Surface of Cowl
d3 Width of Projecting Portion
d4 Width of Connecting Portion of Lens and Body

What is claimed is:

1. A vehicular lamp comprising:
a light source;
a pillar-shaped light guide comprising a plurality of light controlling portions formed on a side surface thereof; and
a lens disposed in front of the light guide,
wherein light emitted from the light source enters the light guide from one end surface of the light guide,
wherein the light guide guides the light inside the light guide,
wherein the light guide emits the guided light forward of the vehicular lamp via the plurality of light controlling portions,
wherein the lens has a thick-walled projecting portion,
wherein the projecting portion is formed to have a rectangular vertical cross-section, and
wherein the projecting portion guides the light emitted from the light guide and emits the light forward of the vehicular lamp.

2. The vehicular lamp according to claim 1,
wherein a front member is provided in front of the lens that conceals a connecting portion between the lens and a lamp body, and
wherein the projecting portion is exposed from the front member.

3. The vehicular lamp according to claim 2,
wherein the projecting portion is formed to extend along a front surface shape of the front member.

4. The vehicular lamp according to claim 3,
wherein the light source and the light guide are provided in a lamp chamber that is defined by the lens and the lamp body, and
wherein the width of the connecting portion between the lens and the lamp body is wider than the width of the projecting portion.

5. The vehicular lamp according to claim 2,
wherein the light source and the light guide are provided in a lamp chamber that is defined by the lens and the lamp body, and
wherein the width of the connecting portion between the lens and the lamp body is wider than the width of the projecting portion.

* * * * *